INVENTOR.
LEWIS L. SALTON
BY
EDWARD D. O'BRIAN
ATTORNEY

United States Patent Office 3,147,369
Patented Sept. 1, 1964

3,147,369
TEMPERATURE CONTROL SYSTEMS
Lewis L. Salton, 1361 Madison Ave., New York 28, N.Y.
Filed Nov. 2, 1962, Ser. No. 234,966
3 Claims. (Cl. 219—449)

This application is a continuation-in-part of the application Serial No. 4,449 filed January 25, 1960, and now Patent No. 3,075,063 issued January 22, 1963.

This invention pertains to systems for use in controlling temperatures.

Such systems normally employ either heating means or cooling means connected to a control device which regulates the operation of such heating or cooling means in response to the temperature of the control device itself. Such control devices are normally thermostats used so as to either open or close an electrical circuit so as to regulate the operation of such heating or cooling means. A large number of different suitable thermostat constructions are known at the present time.

Such thermostats are either adjustable or non-adjustable depending upon whether or not they can be adjusted so as to vary the temperature at which they serve to regulate such a heating or cooling means. Adjustable thermostats can, of course, be set so as to accomplish a regulating function at various temperatures, while non-adjustable thermostats can only be used to accomplish a regulating function at a specified temperature. For many of the applications it is presently necessary to use such adjustable thermostats since in these applications it is necessary to vary the temperature at which a heating or cooling element or device is operated. However, the use of adjustable thermostats with various heating or cooling devices is frequently disadvantageous and undesirable for several reasons.

One major factor tending to limit the use of adjustable thermostats with heating or cooling devices is the fact that such adjustable thermostats are relatively costly. As a general rule it is cheaper to utilize a non-adjustable thermostat with a heating or cooling element or device than it is to use an adjustable thermostat. Non-adjustable thermostats having explosion proof, corrosion resistant and other desirable characteristics can be manufactured much more inexpensively than adjustable thermostats incorporating these same features or characteristics. Because of these considerations it has heretofore been the practice to utilize non-adjustable thermostats only in cases where a single temperature was to be maintained, and to utilize adjustable thermostats whenever it was necessary to control a heating or cooling element or device so as to operate the same over a range of temperatures.

A purpose or object of the present invention is to permit the use of non-adjustable thermostats wherever it is desired to control a system employing a heating or cooling element or device to provide any substantially constant temperature within a range of temperatures. Another object of the present invention is to provide a very simple, inexpensive method of regulating the temperature of a system employing a heating or cooling device or element anywhere within a range of temperatures. A more specific object of the present invention is to teach the use of non-adjustable thermostats instead of adjustable thermostats in the controlling application of electrically heated food servers and the like over a range of temperatures. Various other objects and advantages of this invention will be apparent from the remainder of this specification.

According to the present invention an element or device used for heating or cooling purposes is controlled by a non-adjustable thermostat which is exposed to heat flow from the region where temperature is to be controlled, and means are provided for varying this heat flow received by the non-adjustable thermostat from said region so as to control its operation. Hence, with this construction the non-adjustable thermostat will always act so as to control the operation of a heating or cooling element or device at a "fixed" temperature as far as the thermostat itself is concerned, but will be operative for controlling such an element or device so that it brings the controlled region to another temperature because of the fact that the heat flow affecting such a thermostat may be varied.

The invention is best more fully explained by referring to the accompanying drawing in which.

The accompanying drawing is primarily intended so as to clearly illustrate the character of temperature control systems of this invention. It will be realized from a consideration of this drawing and the remainder of this description that the features of this invention set forth herein and defined in the appended claims may be incorporated within a number of different devices than food servers through the use of routine engineering skill or ability. It will also be realized that the structures employed in temperature control systems as herein described may similarly be varied in accordance with routine engineering skill or ability.

Figure 1:
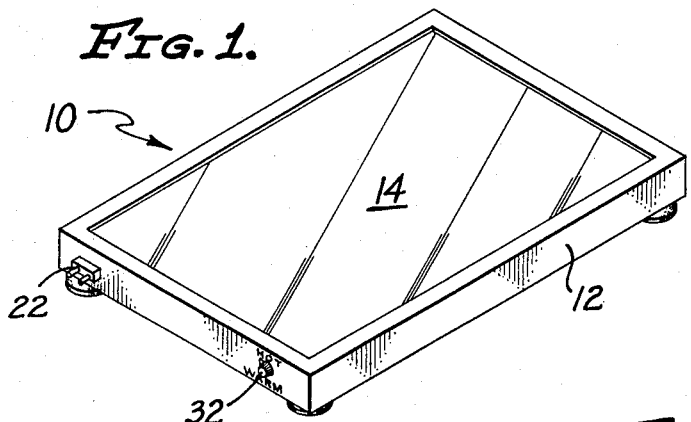
FIG. 1 is a perspective view of a food server including a temperature control system of this invention.
Figure 2:
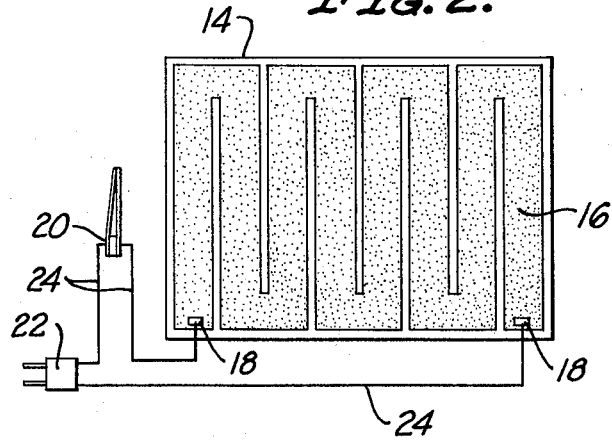
FIG. 2 is a schematic view showing the operative parts of this food server.
Figure 3:
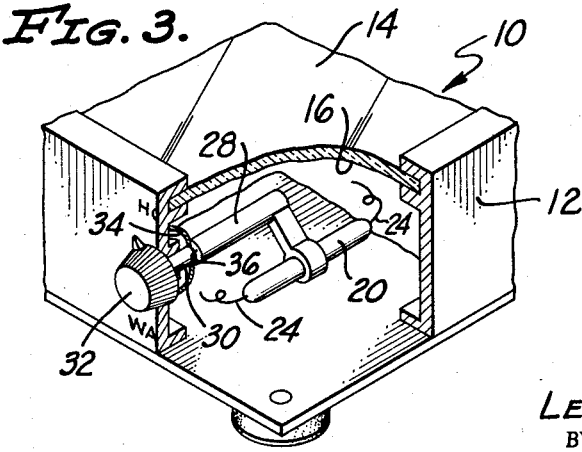
FIG. 3 is an enlarged, cut-away view in perspective, of a part of the food server shown in FIG. 1.

In FIG. 1 of the drawing there is shown a food server 10 utilizing the present invention. This food server 10 is constructed as indicated in the Salton U.S. Patent No. 2,563,875 issued August 14, 1951, except as otherwise indicated herein so as to include an outer metal frame 12, serving to hold a glass plate 14, the undersurface of which is provided with an elongated resistance element 16. An end of this element 16 is connected through a terminal 18 to a conventional, non-adjustable thermostat 20 and a socket 22 by means of wires 24. Another wire 24 connects to the other terminal 18 of the element 16 and the socket 22. The socket 22 is mounted upon the frame 12. Thus, the element 16 and the thermostat 20 are connected in series with one another.

In accordance with this invention the thermostat 20 is mounted upon a small crank arm 26 carried by an extremity of a rotatable shaft 28. This shaft extends through a bearing opening 30 in the frame 12 and carries the small control knob 32 located on the exterior of this frame 12. The shaft 28 is normally held in position by means of a semi-spherical cup-like spring washer 34 which rests against a shoulder 36 on this shaft 28. The shoulder 36 is spaced from the frame 12 so that the washer 34 is held under compression at all times. Thus, by virtue of its resilient character this washer 34 is capable of maintaining the thermostat 20 in any position to which it may be turned.

The operation of the temperature control system of this invention embodied within the server 10 is extremely simple. When the server is to be used the socket 22 is connected to an appropriate source of current. At this time both the resistance elements 16 and the thermostat 20 will be "cool" in that they are at ambient temperature. Because of this the electrical contacts (not shown) within the nonadjustable thermostat 20 will be closed and current will flow through the resistance element 16. As this occurs of course the resistance element 16 will become heated, and heat will be emitted by it through radiation and conduction. Some of this heat will be reaching the thermostat 20, and will cause a temperature rise within this thermostat.

When the temperature within the thermostat 20 reaches a "fixed" temperature at which this thermostat is constructed to operate, the contacts (not shown) within it will open. When this occurs, of course, no further current is applied to the element 16, and the element 16 will gradually cool. Simultaneously, of course, the thermostat 20 will also cool, especially because the element 16 will not emit as much heat as it is cooling as it radiated when current was supplied to it. When the thermostat 20 cools sufficiently so as to reach the "fixed" temperature at which it is constructed to operate the contacts (not shown) within it will close, allowing current to again flow through the element 16.

In accordance with this invention, this system may be set to operate at any temperature over a range of temperatures by turning the knob 32. When the knob 32 is turned the position of the thermostat 20 with respect to the element 16 is changed. The closer the thermostat 20 is rotated to the element 16, the more closely the temperature at which this non-adjustable thermostat will operate so as to open or close the circuit described will correspond to the temperature of the element 16. Similarly, the further the thermostat 20 is rotated from the element 16, the hotter this element must be in order to actuate the thermostat. Hence, with this system of this invention embodied within the server 10 it is possible to use a non-adjustable, conventional thermostat such as the thermostat 20 in order to control the temperature of a heating element, such as the resistance element 16, over a range of temperatures.

In this specification reference is made to the temperature at which a thermostat operates. Those skilled in the art to which this invention pertains will realize that this is common terminology and it is not, strictly speaking, accurate in a technical sense inasmuch as the temperature at which any thermostat operates is determined by the temperature sensitive part or parts in such thermostats. Thus, in accordance with this invention the temperature of a thermostat unit as a whole is substantially unimportant, and the temperature of the operative part or parts in it is of primary importance. In the usual thermostat employed with the present invention such a temperature sensitive part is a bi-metallic strip, movement of which opens or closes contacts so as to make or break an electric circuit. Normally such a strip will not move in this manner so as to open and close contacts at an exact temperature, but will operate so as to accomplish these results at the extremes of a very small range of temperatures. For convenience such a range is referred to herein as the temperature at which a thermostat operates.

Although the embodiment of the invention set forth in this specification relates to food servers or warmers, it will be apparent to those skilled in the art that the basic features of this invention may be used in other systems for controlling temperatures. Thus, these features are applicable to systems involving the use of controlled cooling elements or devices as well as systems involving controlled heating elements or devices, such as the resistance elements described. For these reasons this invention is to be considered as being limited only by the appended claims forming a part of this disclosure.

I claim:

1. In a heating structure having an impervious upper plate carrying an electrical heating element and means defining an enclosed air space beneath said heating element, said means comprising a frame and a bottom, the improvement which comprises:
a non-adjustable thermostat located within said air space, said thermostat being operatively connected to said heating element so as to be capable of regulating the operation of said heating element; and
means for supporting said thermostat so that the distance between said thermostat and said heating element can be varied and so that the orientation of said thermostat within said air space with respect to said heating element is capable of being changed in order to control the temperature at which said heating element is operated, said means comprising a shaft extending through said frame from the inside to the outside of said enclosed air space rotatable on an axis, said axis being at other than right angles with respect to said heating element, means connected to said thermostat and to said shaft for supporting said thermostat by said shaft away from the axis of said shaft, and means connected to said shaft externally of said frame to cause rotation of said shaft to vary the distance between said heating element and said thermostat.

2. The heating structure of claim 1 wherein said means connected to said shaft externally of said frame to cause rotation of said shaft is a manually engageable knob and wherein friction means is in engagement with said shaft and with said frame to resist rotation of said shaft about its axis so that when said thermostat is positioned with respect to said heating element, said thermostat is frictionally retained in that position.

3. The heating structure of claim 2 wherein said supporting means is an arm securing said thermostat radially away from said shaft axis, and wherein said friction means comprises an axial shoulder on said shaft and a spring washer in engagement with said shoulder and with said frame.

References Cited in the file of this patent

UNITED STATES PATENTS

| | | |
|---|---|---|
| 2,007,596 | Burke | July 9, 1935 |
| 2,513,993 | Burton | July 4, 1950 |
| 2,563,874 | Salton | Aug. 14, 1951 |
| 3,075,063 | Salton | Jan. 22, 1963 |